(12) United States Patent
Eurich et al.

(10) Patent No.: US 9,458,943 B2
(45) Date of Patent: Oct. 4, 2016

(54) DIAPHRAGM VALVE

(71) Applicant: BUERKERT WERKE GMBH, Ingelfingen (DE)

(72) Inventors: Werner Eurich, Bretzfeld (DE); Ralf Kettemann, Neuenstein (DE)

(73) Assignee: BUERKERT WERKE GMBH (DE)

( * ) Notice: Subject to any disclaimer, the term of this patent is extended or adjusted under 35 U.S.C. 154(b) by 129 days.

(21) Appl. No.: 14/179,265

(22) Filed: Feb. 12, 2014

(65) Prior Publication Data
US 2014/0224364 A1 Aug. 14, 2014

(30) Foreign Application Priority Data

Feb. 14, 2013 (DE) .................... 20 2013 100 678 U

(51) Int. Cl.
F16K 11/22 (2006.01)
F16K 11/20 (2006.01)
F16K 31/122 (2006.01)

(52) U.S. Cl.
CPC ........... *F16K 11/20* (2013.01); *F16K 31/1221* (2013.01); *F16K 31/1225* (2013.01); *Y10T 137/86879* (2015.04)

(58) Field of Classification Search
CPC ...... F16K 11/022; F16K 11/20; F16K 11/24; F16K 31/1221; F16K 31/1225; Y10T 137/87893; Y10T 137/87684; Y10T 137/86879
USPC ............ 137/606, 885, 883; 251/331, 62, 63, 251/63.5, 63.4
See application file for complete search history.

(56) References Cited

U.S. PATENT DOCUMENTS

| 2,935,086 A | 5/1960 | Lehman et al. ........... 137/599.1 |
| 5,706,859 A | 1/1998 | Bäcklund ...................... 137/885 |

(Continued)

FOREIGN PATENT DOCUMENTS

| DE | 69615212 | 4/2002 | ............. F16K 11/02 |
| DE | 10046979 | 5/2002 | ............. F16K 31/40 |

(Continued)

OTHER PUBLICATIONS

German Search Report issued in related application No. 20 2013 100 678.5, dated Aug. 28, 2013 (5 pgs).

*Primary Examiner* — Craig J Price
(74) *Attorney, Agent, or Firm* — Hayes Soloway P.C.

(57) ABSTRACT

A diaphragm valve for fluid control includes a valve housing having a valve chamber, into which at least three passageways open. The passageways have associated therewith valve seats provided in the valve housing. Further, the diaphragm valve for fluid control includes a diaphragm having various diaphragm sections that can be pressed against associated valve seats in order to selectively open and close flow connections between passageways. Further, the diaphragm valve for fluid control includes at least two control pistons, which are displaceably accommodated in respectively one cylinder chamber and are respectively coupled with the associated diaphragm section via a pressure transfer unit in order to move the diaphragm section, during the movement of the control piston, into an opening or closing position, wherein the cylinder chambers are located at the same axial height, so that the control pistons can be moved next to each other.

14 Claims, 3 Drawing Sheets

(56) References Cited

U.S. PATENT DOCUMENTS

| | | | |
|---|---|---|---|
| 5,971,025 A | 10/1999 | Bäcklund | 137/883 |
| 6,062,260 A | 5/2000 | Yoshimura et al. | 137/596.16 |
| 6,318,408 B1 | 11/2001 | Fukano et al. | 137/625.44 |
| 2004/0056222 A1 | 3/2004 | Stumpe | 251/30.03 |
| 2010/0043738 A1 | 2/2010 | Grandvallet et al. | 123/90.39 |
| 2014/0261779 A1* | 9/2014 | Niver | F16K 11/20 137/468 |

FOREIGN PATENT DOCUMENTS

| | | | |
|---|---|---|---|
| DE | 60017310 | 3/2006 | F15B 13/04 |
| EP | 0 705 403 | 3/2000 | F16K 7/16 |
| EP | 2074345 | 7/2009 | F16K 31/44 |
| FR | 2223605 | 3/1973 | F16K 7/14 |
| FR | 2373737 | 12/1976 | F16K 11/16 |

* cited by examiner

DIAPHRAGM VALVE

FIELD OF THE INVENTION

The invention relates to a diaphragm valve for fluid control, comprising a valve housing having a valve chamber, into which at least three passageways open, wherein the passageways in the valve housing have associated therewith provided valve seats, a diaphragm having various diaphragm sections that can be pushed against associated valve seats so as to selectively open and close flow connections between passageways, and at least two control pistons which are respectively accommodated in a cylinder chamber so as to be displaceable and are respectively coupled with the associated diaphragm section via pressure transfer means in order to move the membrane section, upon a movement of the control piston, into an opening or closing position, wherein the cylinders chambers are located at the same axial height, so that the control pistons can be moved next to each other.

BACKGROUND

Diaphragm valves for fluid control have gases or liquids flow therethrough. In the case of three or more passageways opening into the valve chamber, individual passageways are separated from the remaining passageways, in order to realise for example a 3/2 way valve. Usually, a valve seat in the form of a web, in particular a linear web, is formed between directly adjacent passageway openings. A common diaphragm for a plurality of these valve seats is controlled in sections, so that the corresponding diaphragm section is deformed and is pushed against the valve seat correspondingly to be controlled or, vice versa, is released therefrom.

A generic diaphragm valve is shown in EP 0 705 403 B1. The three passageways are arranged next to each other, so that a central passageway can be flow connected with one of the two lateral passageways or, if the diaphragm is completely released from the valve seats, can be flow connected with both lateral passageways. The valve seats are disposed relatively close to each other, which makes the accommodation of the corresponding control pistons complicated. The control pistons, onto which pressure may be applied from opposite sides so as to move them into the opening and closing positions, require a certain minimum surface area, which is realised according to one embodiment by locating the control pistons on top of one another, i.e. in such a way that they are offset from one another. This means that the "upper" control piston has a ram that must penetrate through the lower control piston so as to be coupled to the diaphragm. In a second embodiment of this prior art document, the control pistons are not axially offset relative to each other in the actuating direction, i.e. if viewed in the axial direction, but rather the cylinder chambers are located at the same axial height, so that the control pistons can be moved next to each other. However, since the rams are disposed relatively close to the centroid of the control pistons, in order to avoid tilting movements, they are located relatively far away from each other and therefore have a relatively large lateral offset from the associated valve seats. This distance of the rams from the seats is disadvantageous for the actuation and above all for the sealing effect.

It is the object of the invention to improve a diaphragm valve in such a way that a reliable closing position can be achieved in the case of valve seats which are located relatively close to each other.

SUMMARY

This is achieved in a diaphragm valve of the type mentioned above by means of the fact that the control pistons have, if viewed in the direction of movement, a substantially flat peripheral wall section and an arc-shaped peripheral wall section, with the flat peripheral wall sections of adjacent control pistons facing each other.

The control pistons according to the invention have a highly unsymmetrical cross-section. As a result of the substantially flat, i.e. flat or only slightly curved, peripheral wall section it is possible to bring the centroids of the control pistons relatively close to each other, as a result of which the pressure transfer means may also be disposed relatively close to each other. Thus, the pressure transfer means, by comparison with the prior art, move relatively close to each other and closer to the valve seats or in exact alignment with the valve seats. Consequently, the pressure force during closing is nearly or even exactly aligned with the valve seats. The arc-shaped peripheral section substantially connects the ends of the flat peripheral wall sections with each other and forms a bulge, wherein the bulges of the two control pistons are directed to be substantially or exactly opposite each other. As a result of the arc-shaped peripheral wall sections, the piston area is significantly enlarged.

Since the control pistons, if viewed in the direction of movement, are designed to be unsymmetrical along the circumference and are taken into the cylinder chamber, which is designed to be complementary thereto, the control pistons are secured against torsion, without any additional means being necessary for this. This has a substantial advantage over circular control pistons, because these receive, during the inward and outward deflection of a return spring that is usually provided, a rotational force by the spring, so that the control pistons rotate in the cylinder chamber.

Preferably, the substantially flat peripheral wall sections are provided with a minimum curvature, which corresponds to at least four times the smallest curvature of the arc-shaped peripheral wall section, in particular at least ten times the smallest curvature of the arc-shaped peripheral wall section. If the arc-shaped peripheral wall section has for example a smallest curvature of 50 mm, then the substantially flat peripheral wall section has at least a curvature of 200 mm or 500 mm.

A preferred embodiment of the invention provides for the peripheral wall sections of the control pistons which face each other to be flat, in the sense of being plane.

The peripheral wall sections preferably form a circle segment.

If viewed in the actuation direction, the pressure transfer means are attached to their associated control piston so as to be closer to the flat peripheral wall section than to the arc-shaped peripheral wall section, which means, in relation to the width of the control piston, which is measured from the flat peripheral wall section, that the pressure transfer means are clearly located in the half that is closer to the flat peripheral wall section.

The pressure transfer means are preferably located, measured from the flat peripheral wall section, in the region of the maximum thickness of the respective control piston.

In relation to the alignment transversely to the flat peripheral wall section, the pressure transfer means are attached in the third that is close to the flat peripheral wall section, and in addition in the region of the maximum thickness of the control piston.

The control pistons should, if viewed in the actuation direction, have a semi-circular shape.

The pressure transfer means comprises for example a ram attached to the control piston. This ram can, optionally, be supported on the drive housing and can be displaceable together with the control piston.

The ram is in particular supported on opposite end walls of the respective cylinder chamber, so that it is provided with tilting stability.

Further, the pressure transfer means may include a pressure piece attached to the ram, which pressure piece has an extension located above the associated diaphragm section to be moved and the associated valve seat. This pressure piece is correspondingly shaped and has an extension, by which it abuts against the side of the diaphragm that is located opposite the valve seat. The extension itself is located, if viewed in the actuation direction, in alignment with the valve seat, so that there is no lateral or substantially no lateral offset.

The respective extension itself, however, may be located with a lateral offset to the ram.

The pressure pieces are, if viewed in the actuation direction, preferably similar to the control pistons, formed with a flat peripheral wall section, which are respectively directed towards the adjacent pressure piece, no that the flat peripheral wall sections face each other.

Optionally, the pressure pieces also include arc-shaped peripheral wall sections. In this context, what was described above in connection with the control pistons also applies in relation to the optional embodiments.

The costs for the diaphragm valve according to the invention can be significantly reduced by designing the plurality of control pistons as carry-over parts and/or by designing also the pressure transfer means as carry-over parts.

The diaphragms and the pressure transfer means can be connected to each other in an interlocking manner, so that the diaphragm, during the movement into the opening position, can be moved into the opening position by the effect of a tension that is transmitted by the pressure transfer means.

The control pistons are in particular designed as hollow bodies having an open end wall. The open end walls of the adjacent control pistons may face in the same (upwards or downwards) or in different directions of movement. In particular, both open end walls face in the same direction.

Further, optionally, also a resilient return means may be provided for forcing an associated control piston into an initial position. In doing so, each individual control piston may be forced by the resilient return member into a normally open position or a normally closed position.

Alternatively, it is also possible not to force one or all of the control pistons; this means that they are not acted upon by a return member. In these control pistons, pressure application into the corresponding chamber will be necessary for reaching the opening and the closing position.

BRIEF DESCRIPTION OF THE DRAWINGS

FIG. 1 shows a diaphragm valve that is provided for controlling fluid flows. This diaphragm valve is preferably pneumatically actuated.

DETAILED DESCRIPTION

Figure 1:
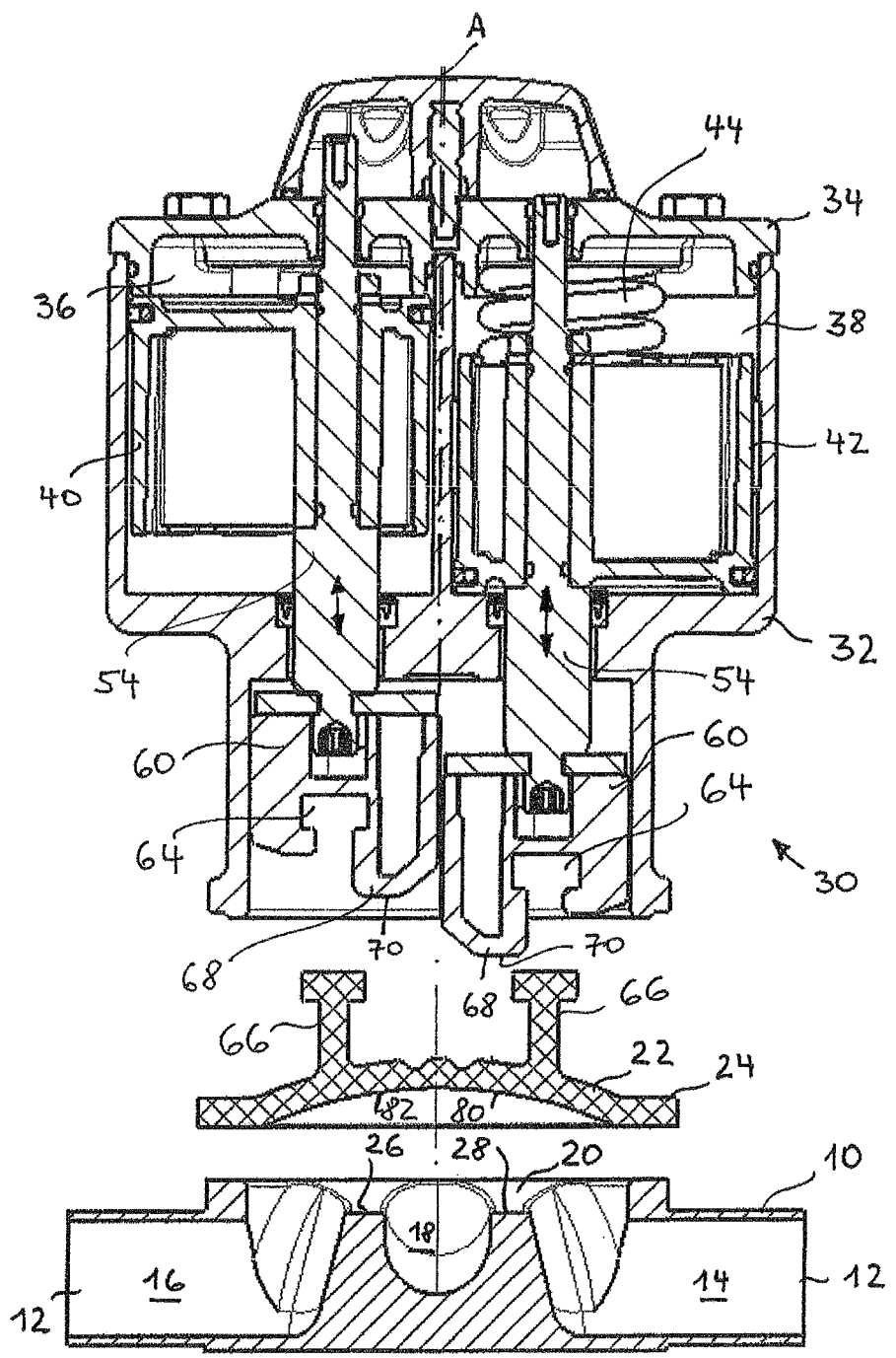
FIG. 1 shows a longitudinal sectional view, partially as an exploded view, of a first embodiment of a diaphragm valve according to the invention.

In the embodiment shown, a valve housing 10 comprises three ports 12, of which two can be seen. These ports 12 merge into passageways in the valve housing 10, i.e. lateral passageways 14, 16 as well as a central passageway 18 that is located between the lateral passageways. All the passageways 14 to 18 open into a valve chamber 20 in the valve housing 10. This valve chamber 20 is upwardly closed by a diaphragm 22, which can be seen in FIGS. 1 and 2.

In the non-assembled condition, the diaphragm 22 is slightly upwardly curved in a dome-shaped manner, see FIG. 1, and has an edge 24 that is pressed against a peripheral edge on the valve chamber 22, in order to seal the latter.

The lateral passageways 14, 16 are respectively separated from the central passageway 18 by a valve seat 26, 28 that forms a linear web if viewed in the axial direction A. The valve seats 26, 28 form, as it were, the edge of the openings of the passageways 14 to 16 between each other.

Moreover, the diaphragm valve shown has a drive 30 with a multi-part housing for moving the diaphragm 22, with a lower housing part 32 as well as a housing cover 34 that closes the housing at the top. In the housing, two cylinder chambers 36, 38 are arranged next to each other, at the same axial height, in relation to the axial axis A which forms the central axis. The cylinder chambers 36, 38 accommodate a control piston 40 and 42, respectively, which can be displaced in an axial direction in the respective cylinder chamber 36, 38. This means that the control pistons 40, 42 move laterally next to each other.

What is not shown are pneumatic connections to the cylinder chambers 36, 38, wherein preferably above and below or, as in the present embodiment, just below the control pistons 40, 42 respectively one connection is present in order to move the respective control piston 40, 42 upwards by introducing pressurised air. The downward movement is carried out by means of the spring and by depressurising the subspaces located below the control pistons 40, 42. Apart from that, in the embodiment shown, the subspaces located above the control pistons 40, 42 are in communication with the surroundings via a ventilation opening, in order to enable a piston movement. A silencer may be provided on the ventilation opening.

As an alternative, however, a connection for pressurised air may be present also either just above or below the control piston 40, 42. It is then necessary for a resilient return member (44), for example in the form of at least one spring, to act on the opposite side in order to effect the return of the control piston 40, 42 in the opposite direction.

Figure 2:
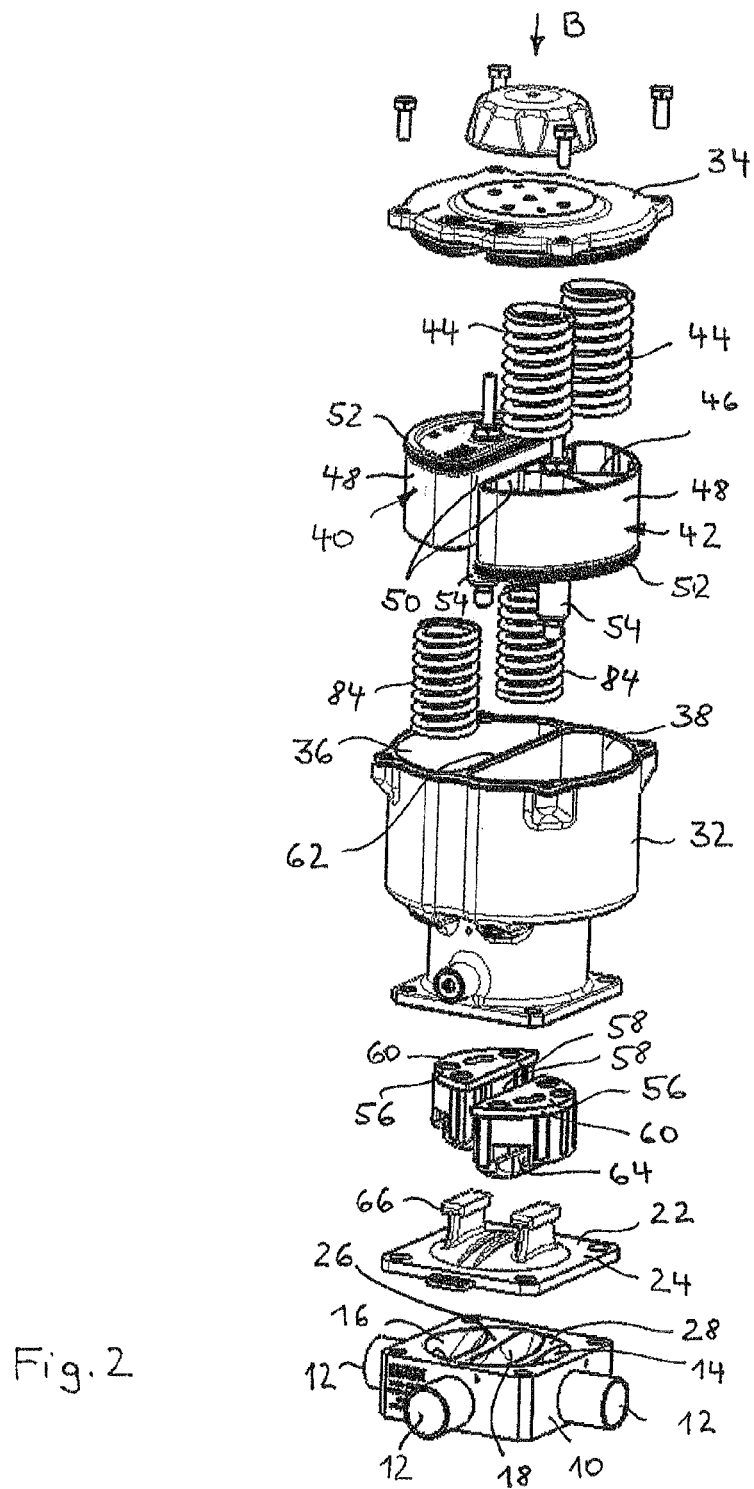
FIG. 2 shows a perspective exploded view of the diaphragm valve according to FIG. 1.

The control pistons 40, 42 are designed as hollow bodies, see FIG. 2, wherein one end side is respectively open and the other one closed (see the control piston 42 in FIG. 2), and the open end sides are located on opposite sides of the control pistons 40, 42. In the center, ribs 46 are provided in order to enhance the stability of the respective control piston 40, 42.

One or more resilient return members, FIG. 2 shows two return members 44, may here also be accommodated in the hollow interior of the control piston(s) 40, 42, which saves space. However, this is not a mandatory option.

The shape of the control pistons 40, 42 is optimised towards a compact, in particular laterally compact, design. If viewed in the actuation direction B, which actuation direction B also corresponds to the direction of the central axis A, each control piston has an arc-shaped peripheral wall section 48, in the present example, this peripheral section is semi-circular but has at least the shape of a circle segment. Moreover, the peripheral wall is formed by a flat peripheral wall section 50, wherein the flat peripheral wall section 50 closes the arc-shaped peripheral section 48, so that the overall shape, if viewed in the actuation direction B, is preferably a semi-circular cylinder.

The flat peripheral wall sections 50 of both control pistons 40 are disposed directly opposite each other, see FIG. 2.

As can be seen in FIG. 2, the cross-sectional shape of the cylinder chambers 36, 38 in the housing part 32 is adapted to the shape of the control pistons 40, 42, so that these are guided in the radial direction and in the rotational direction in a substantially play-free manner. Corresponding O-rings 52 enhance tightness.

Each control piston 40, 42 has attached thereto a pressure transfer means, via which the control piston 40, 42 is coupled to a corresponding section of the diaphragm 22.

In the embodiment shown, which is not to be understood in a limiting sense, each of the two pressure transfer means comprises a ram 54 as well as a pressure piece 56 fixed to that end of the ram 54 that is on the diaphragm side.

If viewed in the actuation direction B, the pressure pieces 56 are also semi-circular with oppositely arranged, substantially flat peripheral wall sections 58 as well as arc-shaped peripheral wall sections 60.

Contrary to the control pistons 40, 42 which are separated from each other by a dividing wall 62 in the housing part 32, no dividing wall is present between the pressure pieces 56.

The rams 54 are fixed to the pressure pieces 56 in such a way that both a tractive and a compressive force can be exerted on the pressure pieces 56 via the rams 54.

On their bottom side, the pressure pieces 56 preferably have a groove, here for example a T-shaped groove 64 extending transversely to the actuation direction B, see above all FIG. 1, into each of which a T-shaped extension 66 on the diaphragm 22 may be laterally inserted, in order to realise an interlocking connection between the pressure pieces 56 and the diaphragm 22, which acts in both axial directions.

Moreover, the pressure pieces 56 respectively have one extension 68 which protrudes axially downwards in the direction of the valve seats 26, 28. The extensions 68 are located exactly or nearly exactly above the valve seats 26, 28 associated with them.

Corresponding press-on surfaces 70 on the bottom side of the extensions 68 are oriented and dimensioned such that they are on the one hand located exactly above the associated valve seats 26, 28 and on the other hand completely or substantially completely cover, if viewed in the actuation direction B, the valve seats 26, 28 in the width direction.

In the assembled condition, the press-on surfaces 70 are respectively positioned on that side of the diaphragm 22 that is respectively opposite the valve seats 26, 28.

As can be seen in FIG. 1, the valve seats 26, 28 are designed to be relatively close to each other, and the linear webs (see FIG. 2), which form the valve seats 26, 28, are substantially parallel.

The rams 54 are also mounted to be relatively close to each other, however, in this embodiment, which is not to be understood in a limiting sense, they have a slightly greater distance than the valve seats 26, 28. This means that a minimal lateral offset is present between the central axis of each ram 24 and the associated projection 68 or the press-on surface 70.

The embodiment with the semi-cylindrical control pistons 40, 42, however, allows the control pistons 40, 42 to be disposed in close lateral vicinity to each other and to dispose the ram 54 close to the centroid of the control pistons 40, 42, in relation to the view in the actuation direction B. Thus, there will be substantially no noticeable tilting moment of the control pistons 40, 42.

Since the rams 54 are supported on both axial ends in the drive housing (on the one hand in the housing part 32 and on the other hand in the cover 34), the position stability of the control pistons 40, 42 is enhanced again.

The functioning mode of the diaphragm valve according to the invention will be explained below.

In the embodiment according to FIG. 1, the control piston 42 is pre-biased by the return member(s) 44 in the direction of the closed valve position (normally closed). This means that the extension 68 of the control piston 42, without any control air pressure on the bottom side of the control piston 42, presses this control piston 42 against the corresponding diaphragm section 80 on the bottom side of the diaphragm 22 against the valve seat 28, so that the passageway 14 is closed towards the central passageway 18.

FIG. 1 shows that no resilient return member is provided for the control piston 40. This control piston 40 has to be moved exclusively by way of applying pressure. If the control piston 40 is forced upwards, the diaphragm section 82 that is opposite the valve seat 26 is spaced apart from the valve seat 26, so that the passageways 16, 18 are in fluid connection with each other.

Depending on the application of pressure and the position of the resilient return member 44, the passageways 14 to 18 can then be in fluid connection with each other or can be separated from each other. The central passageway 18 is preferably the feed or discharge passageway, which can then be selectively flow connected with one or more of the discharge or feed passageways 14, 16.

In the embodiment according to FIG. 2, which is structurally identical with that of FIG. 1, the only difference from the embodiment according to FIG. 1 is that resilient return members 84 are provided for the control piston 40 on that side thereof that is close to the diaphragm 22, which return members press the control piston 40 into the so-called normally open position.

Whether return members 44, 84 are provided and on which side of the respective control piston 40, 42 they are located, falls within the scope of discretion of a person skilled in the art and will be matched to the conditions of use.

For ease of manufacture of the diaphragm valve, the use of a large number of carry-over parts is contemplated. Thus, the control pistons 40, 42, as well as the pressure transfer means with the rams 54 and the pressure pieces 60, are respectively carry-over parts.

Figure 3:
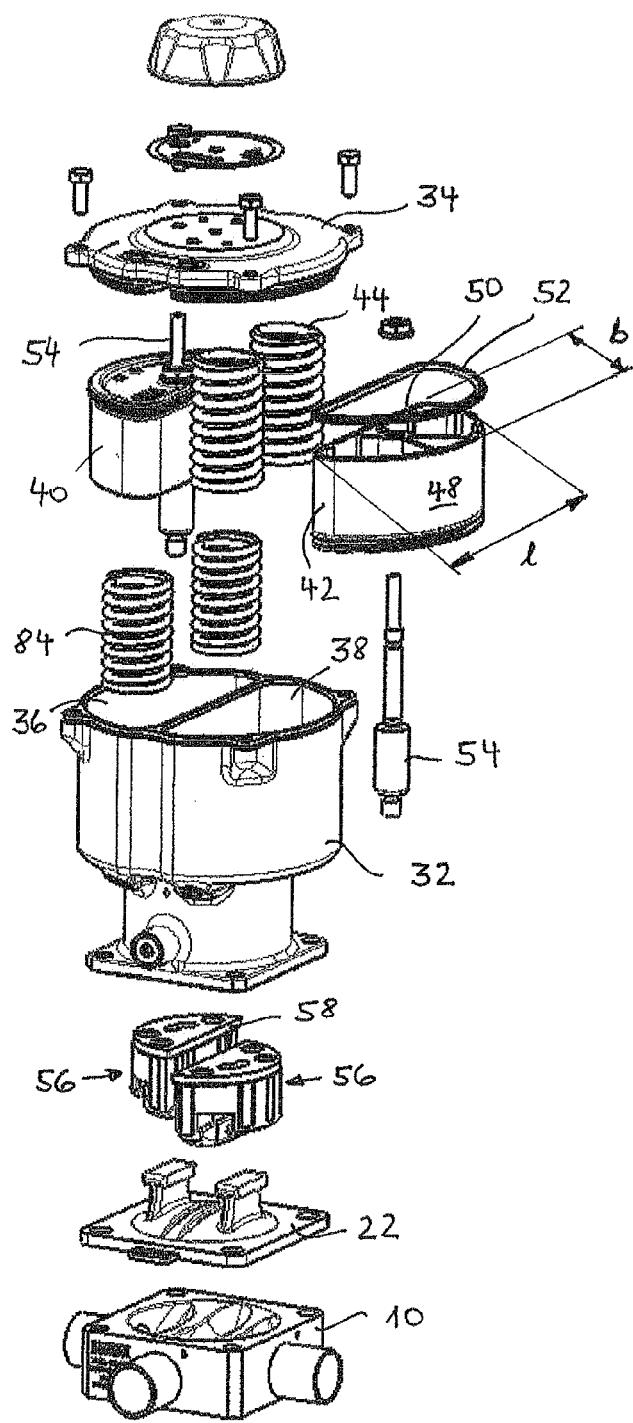
FIG. 3 shows an exploded view of a further embodiment of the diaphragm valve according to the invention.

In the embodiment according to FIG. 3, the resilient return members 44, 84 are respectively provided on the bottom side of the corresponding control pistons 40, 42, which means that both pistons are pre-biased into the normally open direction.

With regard to the position of the rams 54 on the control pistons 40, 42, it is to be mentioned for all embodiments that, measured from the flat peripheral wall section 50, the control pistons 40, 42, have a width b as well as a length l, measured parallel to the flat peripheral wall section 50. The rams 54 are, in relation to their central axis, provided at the center of the respective control piston 40, 42 in relation to the length l (which means in the region of the greatest width b) as well as in a third of a region that is close to the flat peripheral wall section (in relation to the width b, which means in an orientation transversely to the peripheral wall section 50). Thus, the central axes of the rams 54 are located very close to or even in the centroid of the respective piston 40, 42.

Pistons 40, 42 are preferably made from plastics, the same applies to the pressure pieces 56.

The housing of the drive is preferably made from stainless steel.

The diaphragm valve shown may, in spite of its almost identical design, also be used in a very simple manner for a variant in which only a valve seat 26 or 28 is present. This valve seat is eccentrically positioned as shown in FIG. 1. The other valve seat is, as mentioned, not present. This means that there are altogether either only two passageways or, due to the absence of a valve seat, the central passageway 18 is permanently flow connected in relation to one of the adjacent passageways 14 or 16. Due to the omission of the valve seat it becomes possible to design the associated drive for the diaphragm section 80 or 82 in a simplified manner. The corresponding diaphragm drive will then only have a shortened ram 54, which is not movable and permanently retains the diaphragm in the associated section in a central position. Accordingly, also the associated piston 40 or 42 as well as the associated spring 44 may be omitted.

The invention claimed is:

1. A diaphragm valve for fluid control, comprising a valve housing having a valve chamber, into which at least three passageways open, wherein the passageways have associated therewith valve seats provided in the valve housing, a diaphragm having various diaphragm sections which can be pressed against associated valve seats in order to selectively open and close flow connections between passageways, and at least two control pistons which are displaceably accommodated in respectively associated cylinder chambers, and which are respectively coupled with the control pistons' associated diaphragm sections via a pressure transfer unit in order to move the associated diaphragm section into an opening or closing position during the movement of the control piston, each of the pressure transfer units having two opposite ends portions, wherein one end portion is associated to the diaphragm section and the opposite end is coupled to the associated control piston, wherein the cylinder chambers of a pair of adjacent control pistons are located at equal axial height, so that the pair of adjacent control pistons can be moved next to each other, wherein each of the pair of adjacent control pistons have a substantially flat peripheral wall section and an arc-shaped peripheral wall section, wherein the flat peripheral wall section of the pair of adjacent control pistons face each other and wherein the substantially flat peripheral wall section and the arc shaped peripheral wall section are accommodated within the respectively associated cylinder chambers of the pair of adjacent control pistons.

2. The diaphragm valve as claimed in claim 1, wherein the peripheral wall sections face each other and are planar regions.

3. The diaphragm valve as claimed in claim 1, wherein the substantially flat and arc-shaped peripheral wall sections together form a circle segment.

4. The diaphragm valve as claimed in claim 1, wherein the pressure transfer unit is attached to the pressure transfer unit's associated control pistons at an area being located closer to the flat peripheral wall section than to the arc-shaped peripheral wall section.

5. The diaphragm valve as claimed in claim 1, wherein the control piston has a length with a center, and wherein the pressure transfer unit, when viewed in an actuating direction and as measured starting from the flat peripheral wall section, is located in a region of maximum thickness of the respective control piston and/or in the center in relation to the length of the control piston.

6. The diaphragm valve as claimed in claim 1, wherein the pressure transfer unit, in relation to an orientation transverse to the flat peripheral wall section, is attached in a third of a region of the associated control piston that is close to the flat peripheral wall section.

7. The diaphragm valve as claimed in claim 1, wherein the pressure transfer unit comprises a ram attached to the control piston.

8. The diaphragm valve as claimed in claim 7, wherein the ram is supported on a drive housing of the diaphragm valve and said ram can be displaced together with the control piston.

9. The diaphragm valve as claimed in claim 7, wherein a pressure piece disposed on the ram is provided, which has an extension that rests against the associated diaphragm section to be moved.

10. The diaphragm valve as claimed in claim 9, wherein the respective extension is located laterally offset from the associated ram.

11. The diaphragm valve as claimed claim 9, wherein the pressure pieces associated with the pair of adjacent control pistons, each have a flat peripheral wall section and the flat peripheral wall sections of the pressure pieces face each other.

12. The diaphragm valve as claimed claim 11, wherein the pressure pieces have additional arc-shaped peripheral wall sections.

13. The diaphragm valve as claimed in claim 1, wherein the plurality of control pistons are designed as similar parts.

14. The diaphragm valve as claimed in claim 1, wherein the pressure transfer units are designed as a similar parts.

* * * * *